(12) United States Patent
Noguchi et al.

(10) Patent No.: US 7,487,698 B2
(45) Date of Patent: Feb. 10, 2009

(54) FASTENING MEMBER FASTENING METHOD AND APPARATUS

(75) Inventors: Sumio Noguchi, Saitama (JP); Takeshi Katamine, Saitama (JP); Yoshitaka Koyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/592,149

(22) PCT Filed: Feb. 18, 2005

(86) PCT No.: PCT/JP2005/002612

§ 371 (c)(1),
(2), (4) Date: Sep. 8, 2006

(87) PCT Pub. No.: WO2005/084880

PCT Pub. Date: Sep. 15, 2005

(65) Prior Publication Data

US 2007/0180956 A1    Aug. 9, 2007

(30) Foreign Application Priority Data

Mar. 8, 2004 (JP) ............... 2004-064509
Dec. 8, 2004 (JP) ............... 2004-354828

(51) Int. Cl.
*B25B 13/00* (2006.01)
*B25B 23/10* (2006.01)
(52) U.S. Cl. ............... 81/54; 81/451; 81/57.44
(58) Field of Classification Search .............. 81/54, 81/451, 442, 453, 454, 452, 456, 55, 57.36, 81/57.44, 545
See application file for complete search history.

(56) References Cited

U.S. PATENT DOCUMENTS

| | | | | |
|---|---|---|---|---|
| 3,583,451 A | * | 6/1971 | Dixon et al. | 81/451 |
| 3,786,845 A | * | 1/1974 | States | 81/55 |
| RE28,608 E | * | 11/1975 | Dixon | 29/709 |
| 4,462,283 A | * | 7/1984 | Ito | 81/456 |
| 6,144,891 A | | 11/2000 | Murakami et al. | |

FOREIGN PATENT DOCUMENTS

| | | |
|---|---|---|
| JP | S50-107577 | 8/1975 |
| JP | S59-93830 | 6/1984 |
| JP | S61-159130 | 10/1986 |
| JP | 02-076643 | 3/1990 |
| JP | 10-180569 | 7/1998 |
| JP | 11-129163 | 5/1999 |

* cited by examiner

*Primary Examiner*—Hadi Shakeri
(74) *Attorney, Agent, or Firm*—Arent Fox LLP

(57) ABSTRACT

The present invention relates to a fastening member fastening apparatus for positioning and fastening a hexagon head bolt (2) with respect to a nut (7) with an opening (7a). The fastening member fastening apparatus comprises a rotary axle body (1) being rotated by a drive source, a forwardly and backwardly movable socket (3) being connected with a tip end of the rotary axle body (1) and fitting thereon the hexagon head bolt (2), and a guide mechanism (5) having triple claw members (4) which are operated to open and close in accordance with the forward and backward movement of the socket (3). A tip end of the guide mechanism (5) in a closed state is inserted into the opening (7a) of the nut (7) so as to position and fasten the hexagon head bolt (2) with respect to the nut (7).

2 Claims, 19 Drawing Sheets

FASTENING MEMBER FASTENING METHOD AND APPARATUS

CROSS-REFERENCE TO RELATED APPLICATION

This application is a National Stage entry of International Application No. PCT/JP2005/002612 filed Feb. 18, 2005, which claims benefit of Japan Application No. 2004-064509 filed Mar. 8, 2004 and Japan Application No. 2004-354828 filed Dec. 8, 2004, the entire specification claims and drawings of which are incorporated herewith by reference.

TECHNICAL FIELD

The present invention relates to a fastening member fastening method and a fastening member fastening apparatus for positioning a fastening member with respect to a fastened member with a hole so as to fasten the fastening member to the fastened member.

BACKGROUND ART

Hitherto, as a device for positioning a fastening member with respect to a fastened member, there is known such an apparatus which comprises a detector formed by a chucking claw of an automatic screw fastening machine mounted on a tip end of a movable element of a robot the detector having a plurality of detecting elements formed by each of light receiving end faces of plural optical fibers dispersed in a given arrangement on a tip end face of the chucking claw, and a position correcting control means for correcting positional displacement between the tip end of the automatic screw fastening machine and a screw hole by detecting a light transmitted by each of the optical fibers (for example, see Patent Document 1).

Patent Document 1: Japanese patent application publication No. S58-206387.

DISCLOSURE OF THE INVENTION

Problem to be Solved by the Invention

The apparatus disclosed in Patent Document 1, however, has such a disadvantage that the correction of the positional displacement must be carried out after positioning the tip end of the automatic screw fastening machine with respect to the screw hole, thereby incurring complicated structure and uneasy operation, so that it is not possible to improve the operational efficiency.

The present invention is made in view of the above mentioned disadvantage of the prior art and has its object to provide a fastening member fastening method and a fastening member fastening apparatus which are simple in structure and may carry out the precise fastening operation of the fastening member.

Means for Solving the Problem

To solve the above mentioned disadvantage, according to the present invention, there is provided a fastening member fastening method adapted to position a fastening member with respect to a fastened member so as to fasten the fastening member to the fastened member, comprising the steps of moving a guide mechanism to an opened state and a socket to an advanced position, fitting a fastening member on the socket, bringing the fasting member fitted socket into a retreated position and the guide mechanism into a closed state, inserting a tip end of the closed guide mechanism into a hole of the fastened member, bringing the guide mechanism into the opened state and fastening the fastening member to the fastened member by advancing and rotating the fastening member fitted socket, and retreating the socket and the guide mechanism after the fastening member is completely fastened to the fastened member.

According to the present invention, there is also provided a fastening member fastening apparatus in which a fastening member is positioned with respect to a fastened member so as to fasten the fastening member to the fastened member, comprising a rotary axle body being rotatable through a drive source, a forwardly and backwardly movable socket being connected with a tip end of the rotary aide body and fitting the fastening member hereon, and a guide mechanism having a plurality of claw members and the like which are opened and closed in accordance with the forward and backward movement of the socket, wherein a tip end of the closed guide mechanism is inserted into a hole of the fastened member so as to position and fasten the fastening member fitted on the socket with respect to the fastened member.

According to the invention, in the fastening member fastening apparatus as described above, the rotary axle body is provided with an air cylinder which comprises a cylinder formed with a first hollow chamber and a second hollow chamber, a first piston connected with rear ends of the claw members and arranged to be slidable within the first hollow chamber, and a second piston arranged to be slidable within the second hollow chamber which is in communication with the first hollow chamber through a through bore when the first piston is positioned in the rearward of the first hollow chamber, and wherein the forward and backward movement of the socket is carried out by the operation of the second piston, and the opening and closing movement of the guide mechanism is carried out by the operation of the first piston.

According to the invention, in the fastening member fastening apparatus as described above, the backward movement of the socket and the opening movement of the guide mechanism are carried out by operating the first piston and the second piston through a spring.

According to the invention, there is also provided a fastening member fastening apparatus in which a fastening member is positioned with respect to a fastened member so as to fasten the fastening member to the fastened member, comprising a rotary axle body being rotatable through a rotation drive means, a socket being connected with a tip end of the rotary axle body to fit the fastening member thereon and arranged to be forwardly and backwardly movable by a first drive means, and a guide mechanism being arranged to surround the socket and the rotary axle body and having a plurality of claw members and the like which are operated to open and close and moved forwardly and backwardly by a second drive means, wherein a tip end of the closed guide mechanism is inserted into a hole of the fastened member so as to position and fasten the fastening member fined on the socket with respect to the fastened member.

EFFECTS OF THE INVENTION

As explained above, according to the present invention, the fastening member fitted on the socket is easily positioned with respect to the fastened member by inserting the tip end of the guide mechanism formed with the plurality of claw members into the hole of the fastened member, so that the fastening operation of the fastening member may be precisely carried out Further, according to the invention, when providing separately the drive means for the forward and backward movement of the socket and the drive means for the opening and closing movement and the forward and backward movement of the guide mechanism, it is possible to independently adjust or control the speed and timing of the forward and backward movement of the socket and the speed and timing of the opening and closing movement and of the forward and backward movement of the guide mechanism, thus enabling smooth fastening operation to be realized.

BEST MODE FOR CARRYING OUT THE INVENTION

Figure 4:
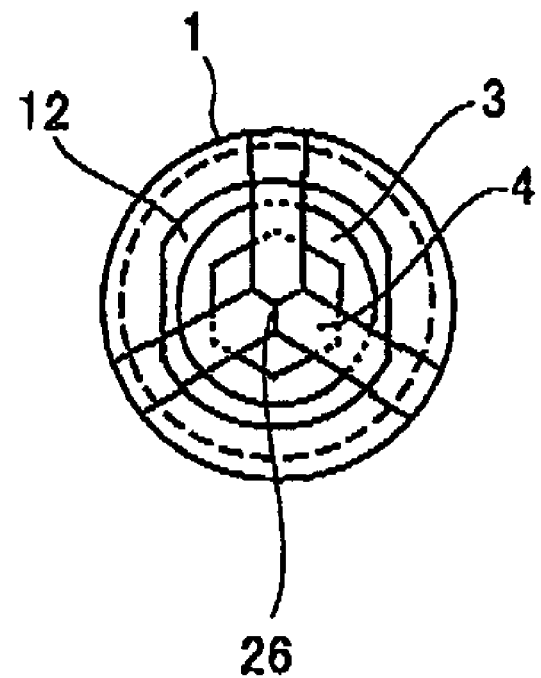
FIG. 4 is a front view of the first embodiment of the fastening member fastening apparatus according to the present invention, in which the guide mechanism is in the closed state and the socket on which no hexagon head bolt is fitted is in the retreated position.
Figure 5:
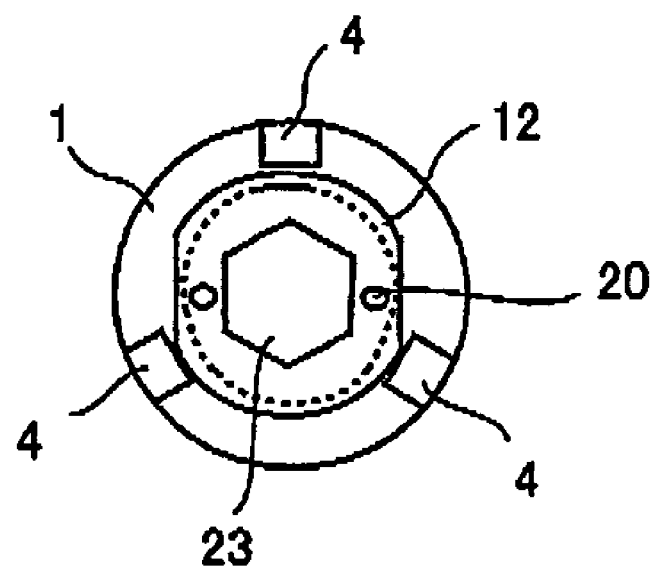
FIG. 5 is a cross sectional view taken along line A-A of FIG. 1.
Figure 6:
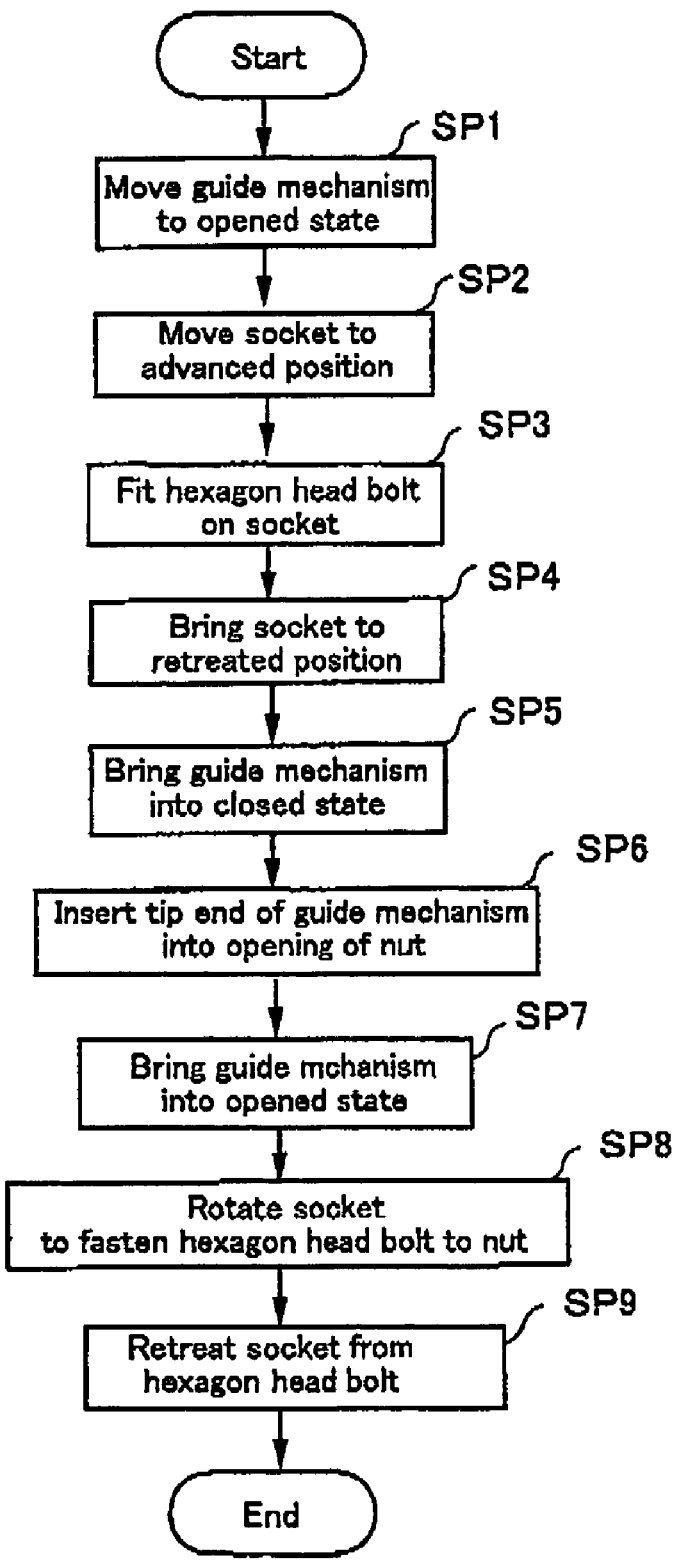
FIG. 6 is a flow chart showing operation steps of the fastening member fastening method according to the present invention.
Figure 7:
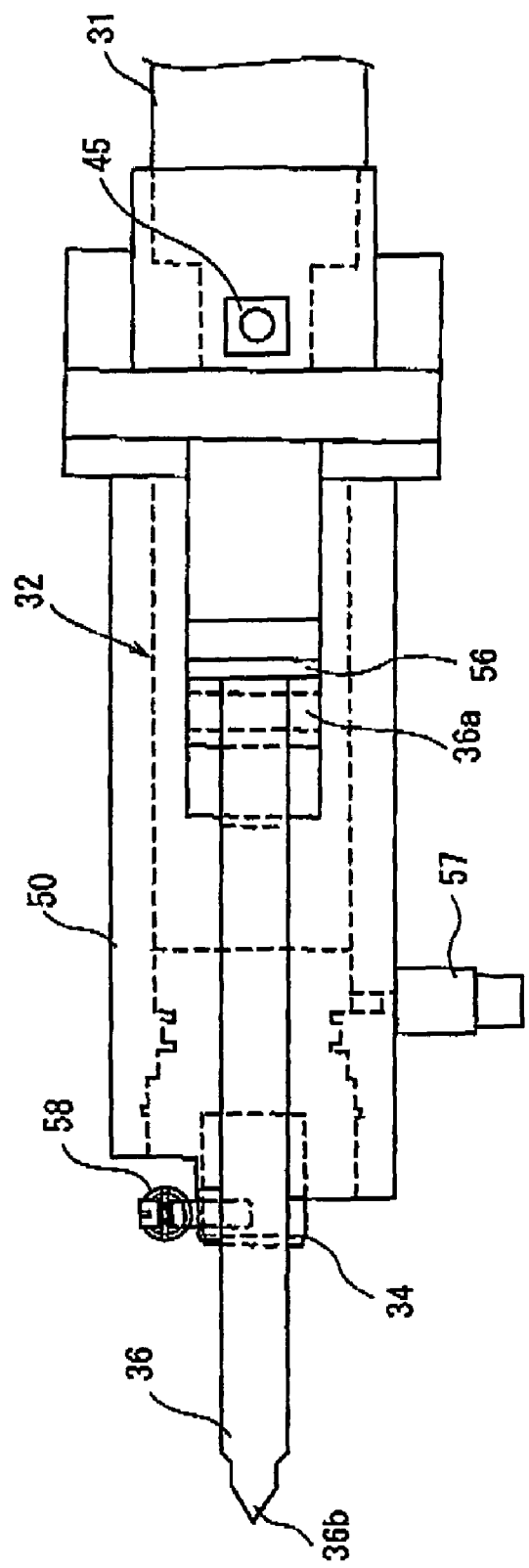
FIG. 7 is a plan view of a second embodiment of a fastening member fastening apparatus according to the present invention, in which a guide mechanism is in a closed state and a socket on which no hexagon head bolt is fitted is in a retreated position.
Figure 8:
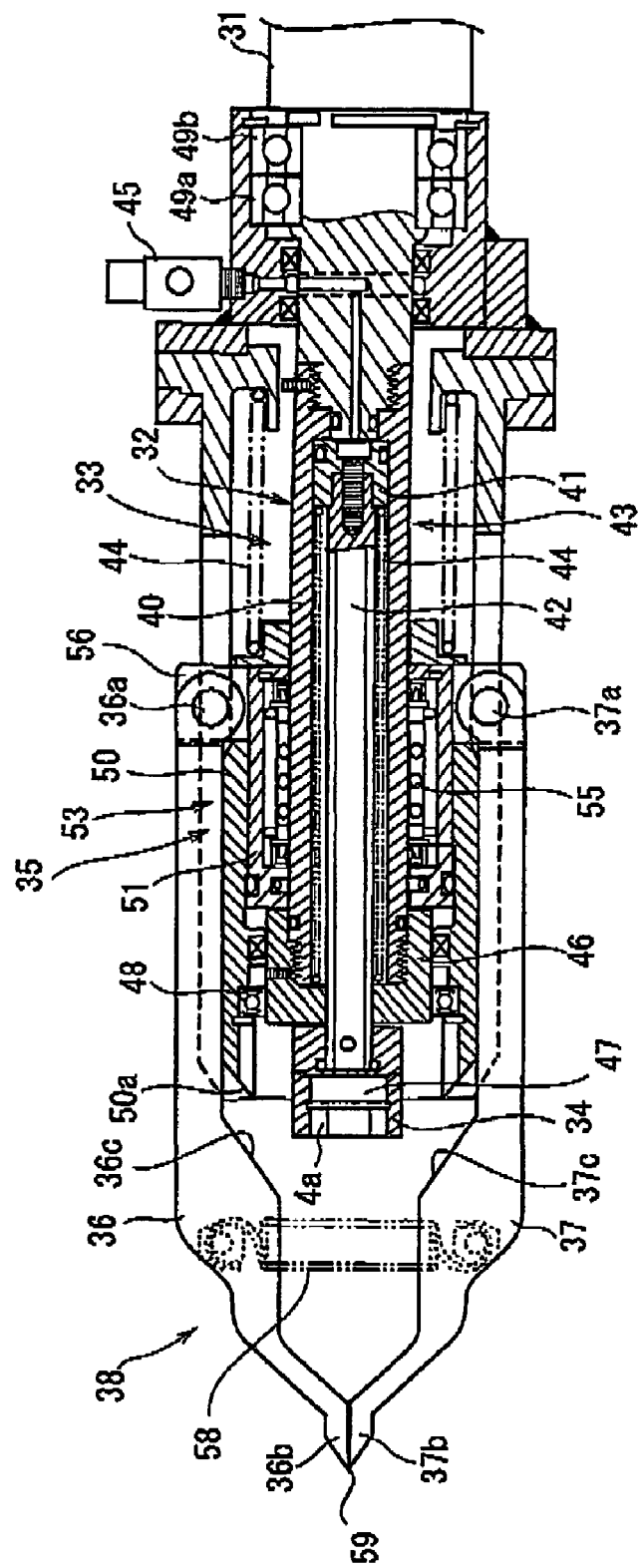
FIG. 8 is a cross sectional view of the second embodiment of the fastening member fastening apparatus according to the present invention, in which the guide mechanism is in the closed state and the socket on which no hexagon head bolt is fitted is in the retreated position.
Figure 9:
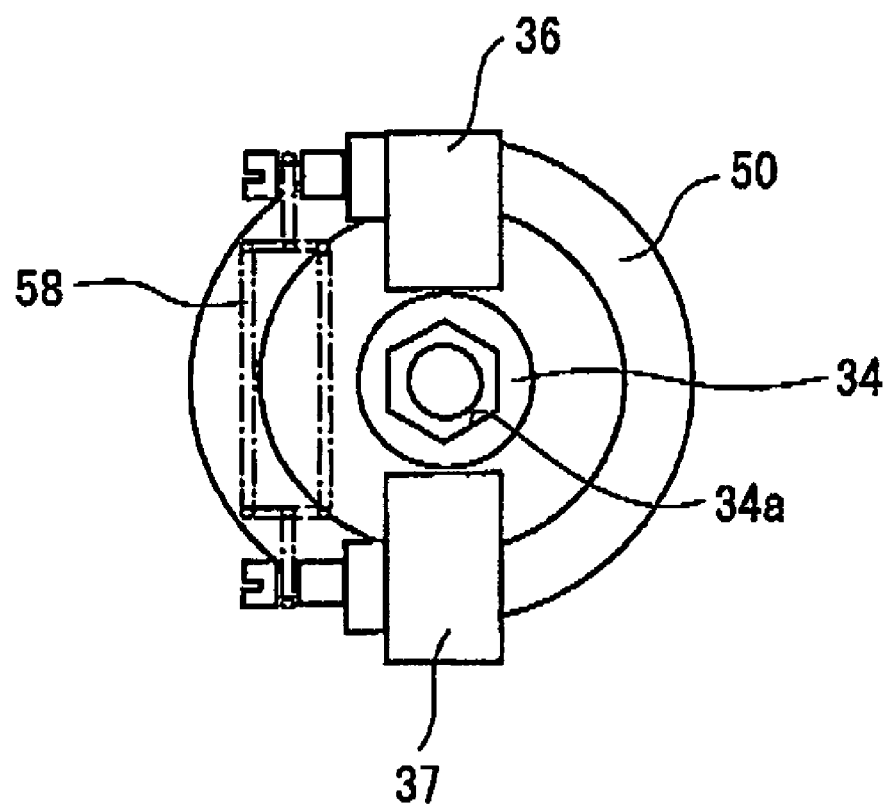
FIG. 9 is a front view of the second embodiment of the fastening member fastening apparatus according to the present invention, in which the guide mechanism is in an opened state and the socket on which no hexagon head bolt is fitted is in the retreated position.
Figure 10:
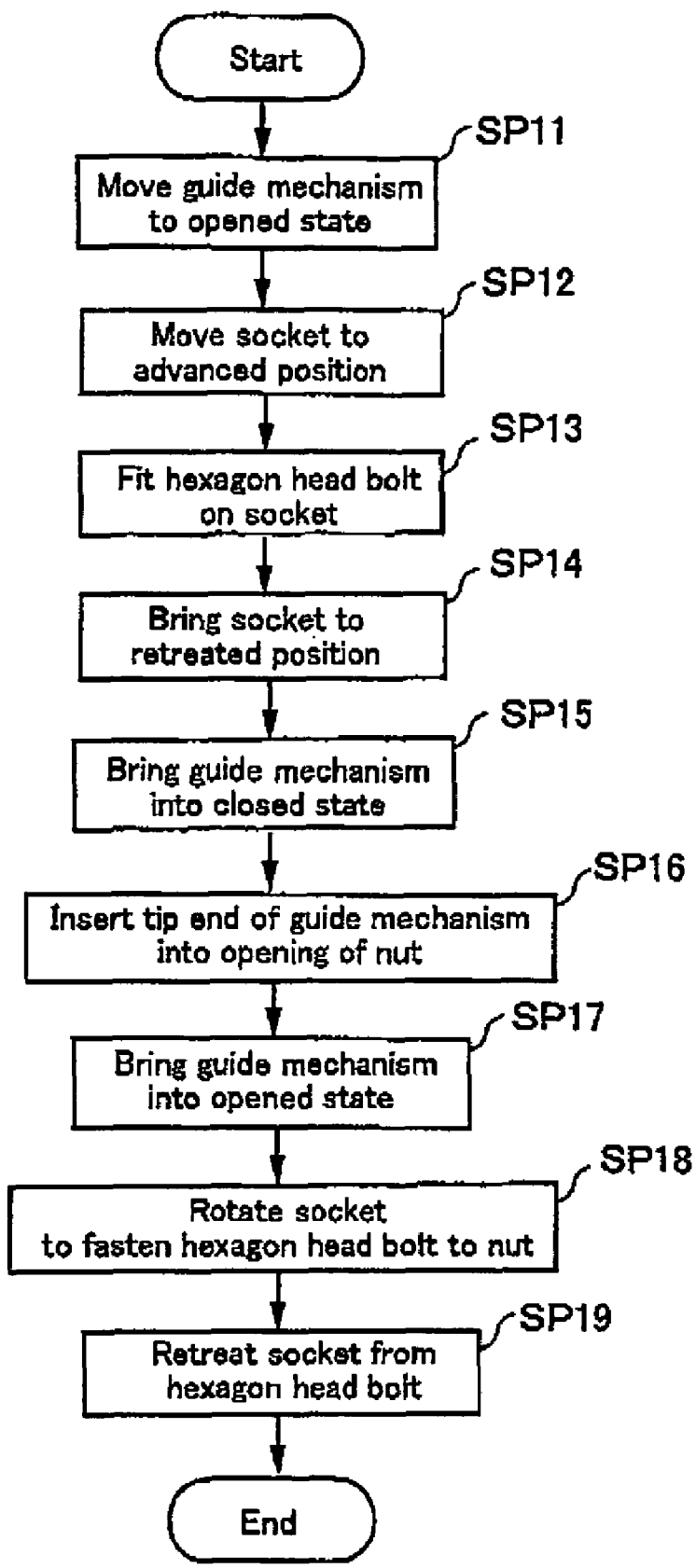
FIG. 10 is a flow chart showing operation steps of the second embodiment of the fastening member fasting method according to the present invention.

Preferred embodiments of the present invention will now be explained with reference to the accompanying drawings. Herein, FIG. 1 is a side view of a first embodiment of a fastening member fastening apparatus according to the present invention, FIG. 2 and FIG. 3 are cross sectional views thereof, FIG. 4 is a front view thereof, FIG. 5 is a cross sectional view taken along line A-A of FIG. 1, FIG. 6 is a flow chart showing operation steps of a fastening member fastening method according to the present invention, FIG. 7 is a plan view of a second embodiment of a fastening member fastening apparatus according to the present invention, FIG. 8 is a cross sectional view thereof, FIG. 9 is a front view thereof, FIG. 10 is a flow chart showing fastening operation steps, and FIGS. 11-20 are explanatory views of operation of the apparatus.

Figure 1:
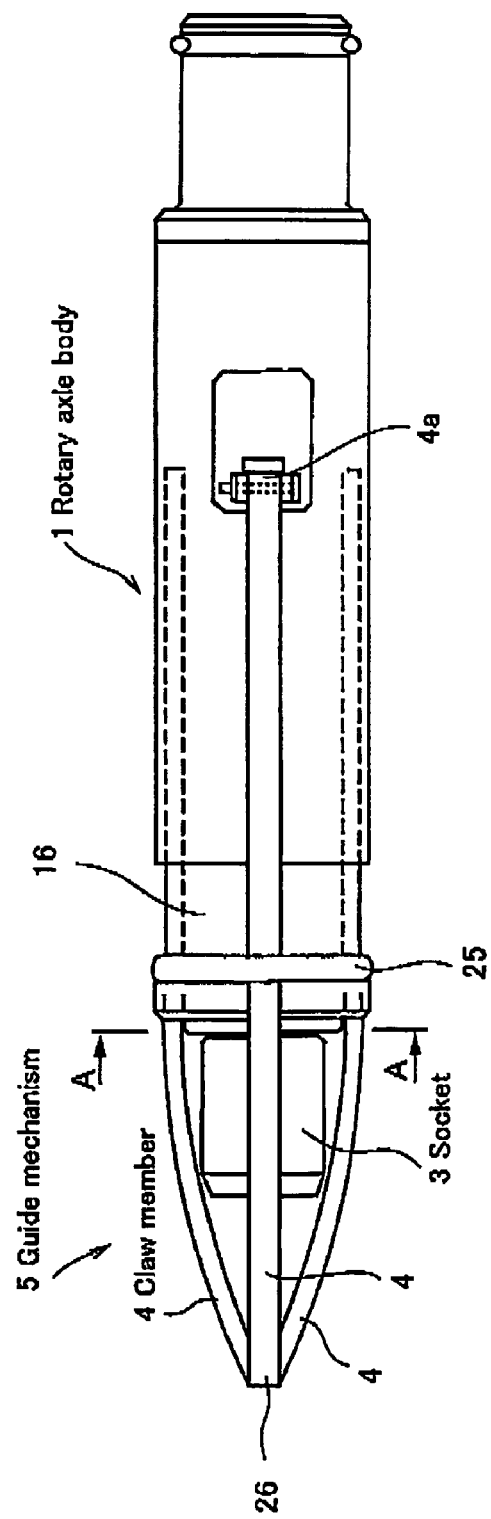
FIG. 1 is a side view of a first embodiment of a fastening member fastening apparatus according to the present invention, in which a guide mechanism is in a closed state and a socket on which no hexagon head bolt is fitted is in a retreated position.

As shown in FIG. 1, the fastening member fastening apparatus with reference to the first embodiment of the present invention comprises a rotary axle body 1 being rotatable through an air drive source (not shown), a forwardly and backwardly movable socket 3 being connected with a tip end of the rotary axle body 1 to fit a hexagon head bolt 2 functioning as the fastening member thereon, and a guide mechanism 5 being formed with triple claw members 4 and the like which are operated to open and close in accordance with forward and backward movement of the socket 3. A fastened member to which the hexagon head bolt 2 functioning as the fastening member is fastened is a nut 7 fixedly secured by welding to a back surface of a sheet metal member 6.

Figure 2:
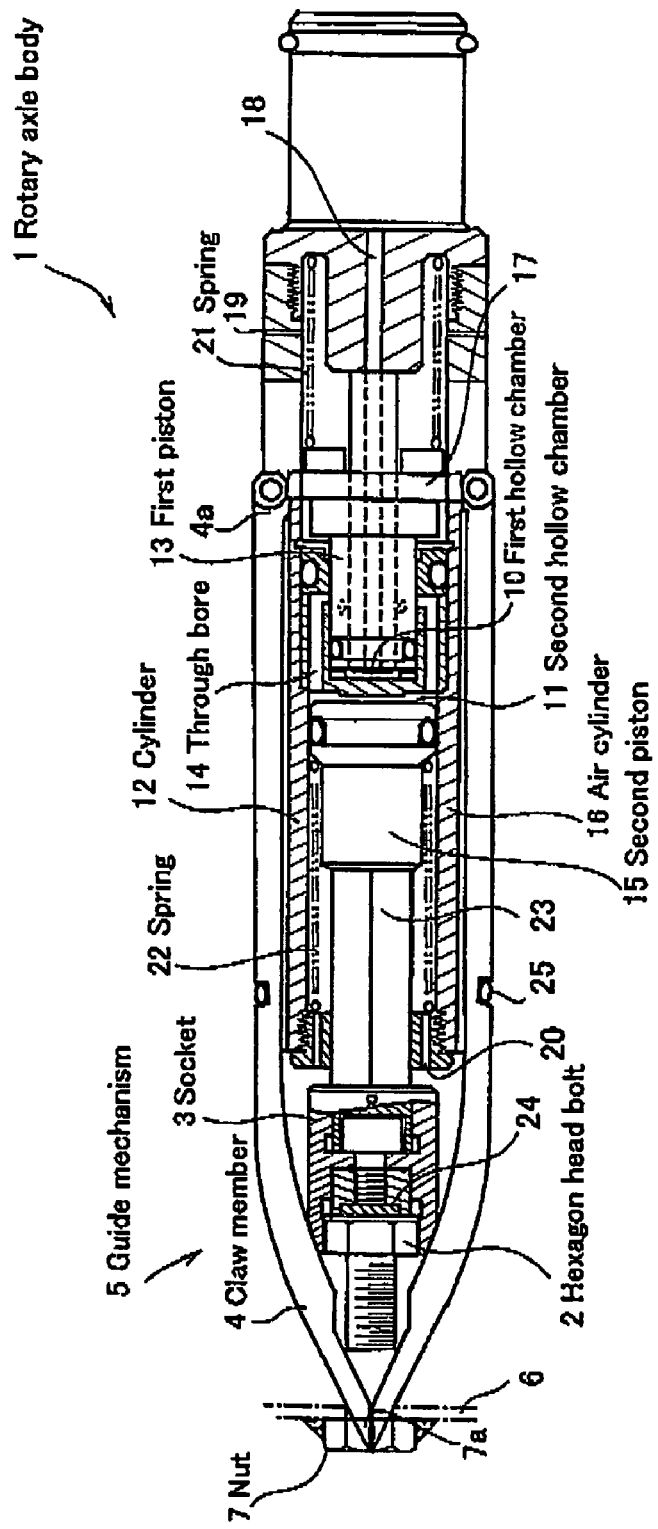
FIG. 2 is a cross sectional view of the first embodiment of the fastening member fastening apparatus according to the present invention, in which the guide mechanism is in the closed state and the socket on which a hexagon head bolt is fitted is in the retreated position.
Figure 3:
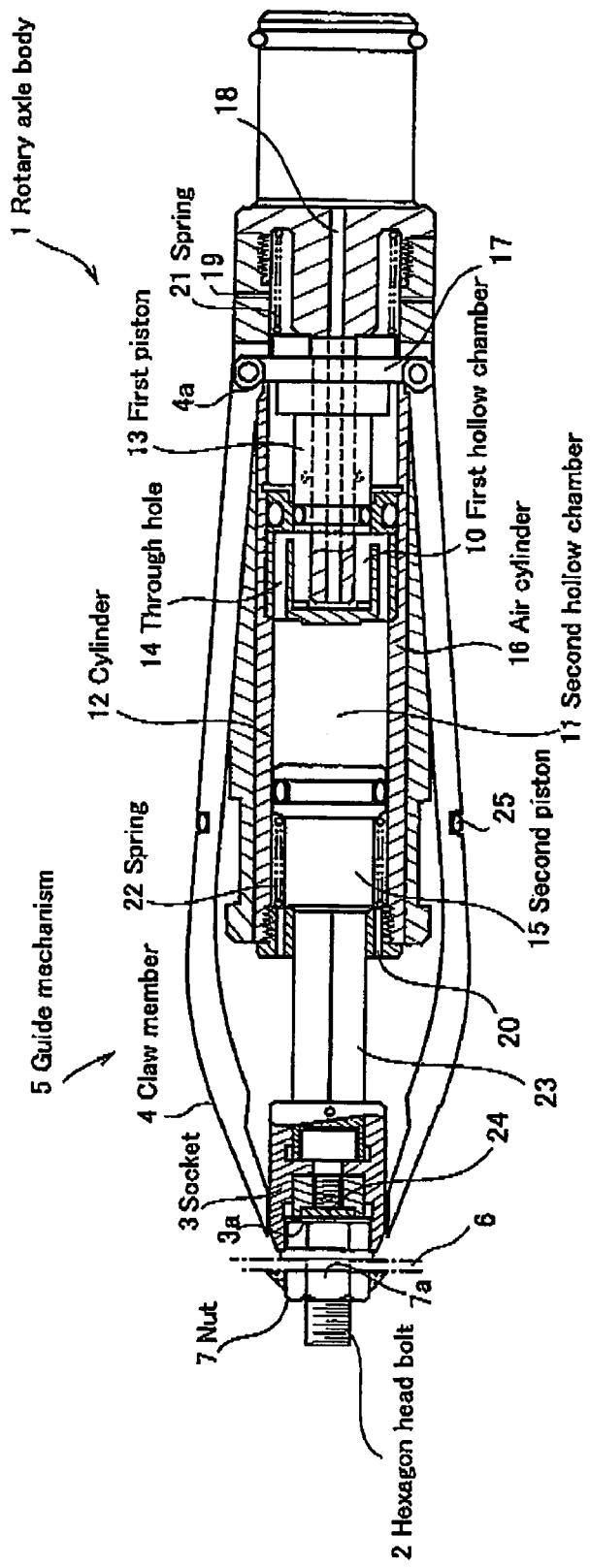
FIG. 3 is a cross sectional view of the first embodiment of the fastening member fastening apparatus according to the present invention, in which the guide mechanism is in an opened state and the socket on which the hexagon head bolt is fitted is in an advanced position.

The rotary axle body 1, as shown in FIG. 2 or FIG. 3, is provided with an air cylinder 16 which comprises a cylinder 12 formed with a first hollow chamber 10 and a second hollow chamber 10, a first piston 13 arranged to be slidable within the first hollow chamber 10, and a second piston 15 arranged to be slidable within the second hollow chamber 11 which is in communication with the first hollow chamber 10 via through bores 14 when the first piston 13 is located in a rearward position of the first hollow chamber 10.

The first piston 13 is connected with rear ends 4a of the triple claw members 4 through a slider 17 integrally formed with the first piston 13. Numeral 18 denotes an air supply pipe for supplying an air from an air supply source (not shown) to the air cylinder 16, and numerals 19, 20 each denote air bleeder orifices.

The first piston 13 is moved backwardly by the air supplied from the air supply source and moved forwardly through the slider 17 by a spring 21 when the air supply from the air supply source is stopped. The second piston 15 is moved forwardly by the air supplied via the first hollow chamber 10 and the through bores 14 from the air supply source and moved backwardly by a spring 22 when the air supply from the air supply source is stopper.

The socket 3 is connected with the second piston 15 through a hexagonal rod 23. The hexagonal shape of the rod 23 as shown in FIG. 5 is for having the cylinder 12 rotated together with it. On the socket 3, there is formed a hexagonal recess 3a into which a head 2a of the hexagon head bolt 2 is able to be inserted. A magnet 24 is fixedly secured to the bottom of the recess 3a for attracting and holding the head 2a of the hexagon head bolt 2.

Further, the socket 3 is moved forwardly and backwardly by the movement of the second piston 15 and is rotated for fastening through the rotation of the rotary axle body 1 by the air drive source in such an advanced position that the hexagon head bolt 2 is fitted thereon.

The guide mechanism 5 comprises the triple claw members 4, as described above, which are arranged around a pivotal axis of the rotary axle body 1 at a central angle of 120 degrees so as to be opened and closed by the action of the piston 13. In order to smoothly carry out the closing operation of the guide mechanism 5, a belt 25 of resilient material is wound around substantially middle portions of the claw members 4.

When the guide mechanism 5 is in a closed state, the tip ends 4b of the claw members 4 are combined into one as shown in FIG. 4, and this combined tip end 26 is inserted into an opening 7a of the nut 7 as the fastened member, so that centering of the hexagon head bolt 2 with respect to the nut 7 is carried out.

Next, operation of the first embodiment of the fastening member fastening apparatus and the fastening member fastening method according to the present invention will now be explained hereunder with reference to the flow chart of FIG. 6 showing operation steps of the fastening method. Herein, the fastening member fastening apparatus of the first embodiment of the present invention is mounted by means of a floating mechanism (not shown) on an automatic machine such as an industrial robot, etc.

First, in step SP1, by operating the automatic machine, the fastening member fastening apparatus in such a state shown in FIG. 1 that the guide mechanism 5 is closed and the hexagon head bolt 2 is not fitted thereon, is transferred to a supply station of the hexagon head bolts 2. Then, the air is supplied through the air supply pipe 18 from the air supply source to the first hollow chamber 10, thereby having the first piston 13, namely, the slider 17 moved backwardly and having the triple claw members 4, namely, the guide mechanism 5 moved to an opened state.

Next, in step SP2, when the first piston 13 is retreated up to the predetermined position, the first hollow chamber 10 is communicated with the through bores 14 to supply the air from the air supply source to the second hollow chamber 11, and thus the second piston is moved forwardly to bring the socket 3 into an advanced position.

Then, in step SP3, the hexagon head bolt 2 is fitted in position on the socket 3 with the aid of the magnet 24.

In step SP4, the air supply from the air supply source is stopped, and the second piston 15 is moved backwardly by the resilient force of the spring 22 thereby retreating the socket 3 which has the hexagon head bolt 2 fitted thereon.

At the same time, in step SP5, the first piston 13, namely, the slider 17 is moved forwardly by the resilient force of the spring 21 so as to brig the triple claw members 4, namely, the guide mechanism 5 into the closed state.

Next, in step SP6, as shown in FIG. 2, the fastening member fastening apparatus is transferred to a fastening station by operating the automatic machine. Then, the pivotal axis of the rotary axle body 1 is set perpendicularly to the opening 7a of the nut 7 which is fixedly secured to the back surface of the sheet metal member 6, so as to insert the tip end 26 of the guide mechanism 5 into the opening 7a.

Next, in step SP7, the air from the air supply source is supplied through the air supply pipe 18 to the first hollow chamber 10, so that the first piston 13, namely, the slider 17 is moved backwardly to bring the triple claw members 4, namely, the guide mechanism 5 into the opened state.

Further, in step SP8, as shown in FIG. 3, when the first piston 13 is retreated to the predetermined position, the first hollow chamber 10 is in communication with the through bores 14 to supply the air from the air supply source to the second hollow chamber 11, whereby the second piston 15 is moved forwardly to advance the socket 3, while the rotary axle body 1, namely, the socket 3 is rotated by the air drive source so as to fasten the hexagon head bolt 2 to the nut 7.

Then, in step SP9, when reaching the predetermined fastening torque, the rotation of the rotary axle body 1 is stopped, and the socket 3 is disengaged from the head 2a of the hexagon head bolt 2 by the operation of the automatic machine, so that it returns to its original position.

With the above explained operation steps, the fastening operation of the hexagon head bolt 2 with respect to the nut 7 is finished.

Next, the fastening member fastening apparatus with reference to the second embodiment of the present invention, as shown in FIG. 7 and FIG. 8, comprises a rotary axle body 32 being rotatable through a rotation drive means 31, a socket 34 being connected with a tip end of the rotary axle body 32 to fit thereon a hexagon head bolt functioning as the fastening member while being forwardly and backwardly movable by a first drive means 31, and a guide mechanism 38 being so arranged as to surround the socket 34 and the rotary axle body 32 and formed with dual claw members 36, 37 and the like which are operated by a second drive means 35 to open and close and to move forwardly and backwardly. A fastened member to which the hexagon head bolt functioning as the fastening member is fastened is a nut which is fixedly secured by welding to a back surface of a sheet metal member.

The rotary axle body 32, as shown in FIG. 8, is provided with a first air cylinder 43. The first air cylinder 43 comprises a first cylinder 40, a first piston 41 being slidable within the first cylinder 40, and a rod 42 whose one end is mounted on the first piston 41. The first piston 41 is forced in a backward direction by a spring 44 arranged in compressed fashion within the first cylinder 40. On the other end of the rod 42 there is mounted the socket 34.

The first drive means 33 for having the socket 34 moved forwardly and backwardly comprises the first air cylinder 43, a first electromagnetic valve 45 for supplying an air to push the first piston 41 in a forward direction, and an air supply source (not shown). The electromagnetic valve 45 is also provided with a function for adjusting or controlling the speed of forward and backward movement of the first piston 41. The first piston 41 is moved forwardly by the air supplied through the first electromagnetic valve 45 from the air supply source and moved backwardly by the spring 44 when the air supply from the air supply source is stopped. Numeral 46 denotes a cap member for supporting the rod 42 and having the spring 44 arranged in compressed fashion between the first piston 41 and itself.

The socket 34 is connected with the first piston 41 through the hexagonal rod 42. The hexagonal shape of the rod 23 as shown in FIG. 8 is for assuredly transmitting the rotation by the rotation drive means 31 through the first cylinder 40, the cap member 46, etc. to the socket 34 connected with the rod 42. On the socket 34, there is formed, as shown in FIG. 9, a hexagonal recess 34a into which a head of the hexagon head bolt can be inserted. A magnet 47 is fixedly secured to the bottom of the recess 34a to attract and hold the head of the hexagon head bolt.

Further, the socket 34 is moved forwardly and backwardly by the movement of the first piston 41 and is rotated for fastening through the rotation of the rotary axle body 32 by the rotation drive means 31 in such an advanced position that the hexagon head bolt is fitted thereon. Numerals 48, 49a and 49b each denote bearings for smoothly rotating the rotary axle body 32.

The guide mechanism 38 is arranged around the rotary axle body 32 and comprises a second air cylinder 53 and the dual claw members 36, 37. The second air cylinder 53 has a second cylinder 50 and a second piston 51 which is arranged slidable between the second cylinder 50 and the first cylinder 40. The second piston 51 is forced forwardly by a spring 54 which is arranged within the second cylinder 50 in compressed fashion. On the second piston 51 there are provided a slider 55 for facilitating the forward and backward movement and a bracket 56 for mounting thereon rear ends 36a, 37a of the claw members 36, 37.

Further, the second drive means 35 for operating the dual claw members 36, 37 to be opened and closed comprises the second air cylinder 53, a second electromagnetic valve 57 for supplying an air to push the second piston 51 in the backward direction, and an air supply source (not shown). The second electromagnetic valve 57 is also provided with a function for adjusting or controlling the speed of forward and backward movement of the second piston 51. The second piston 51 is moved backwardly by the air supplied through the second electromagnetic valve 57 from the air supply source while it is moved forwardly by the spring 54 when the air supply from the air supply source is stopped.

The dual claw members 36, 37 are arranged around a pivotal axis of the rotary axle body 32 at a central angle of 180 degrees. The claw members 36, 37 is brought into the opened state in such a manner that inclined back walls 36c, 37c of the claw members 36, 37 move backwardly and come into contact with an inclined tip end 50a of the second cylinder 50 during the backward movement of the second piston 51. In view of smoothly carrying out the opening and closing operation of the claw members 36. 37, a spring 58 is provided around the tip ends of the claw members 36, 37 for constantly forcing the claw members 36, 37 to the closed state.

Figure 16:
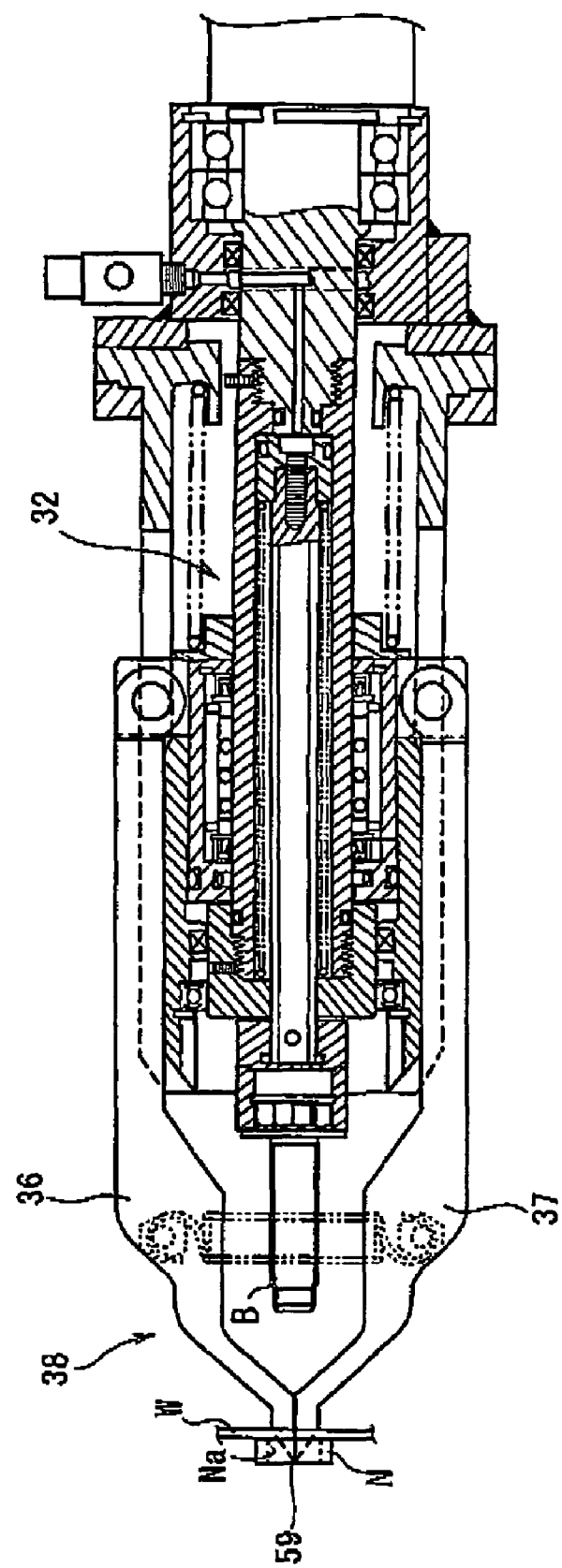
FIG. 16 is an explanatory view of the operation of the fastening member fastening apparatus showing a centering state.

As will be described hereunder in explanation of the operation of the fastening member fastening apparatus as shown in FIG. 16, when the dual claw members 36, 37 are in their closed positions, tip ends 36b, 37b of the claw members 36, 37 are combined into one, and the combined tip end 59 is inserted into an opening Na of the nut N functioning as the fastened member so as to carry out centering of the hexagon head bolt B with respect to the nut N.

Next, operation of the second embodiment of the fastening member fastening apparatus according to the present invention will now be explained hereunder with reference to the flow chart shown in FIG. 10. Herein, the fastening member fastening apparatus of the second embodiment of the present invention is mounted by means of a floating mechanism (not shown) on an automatic machine such as an industrial robot, etc.

Figure 11:
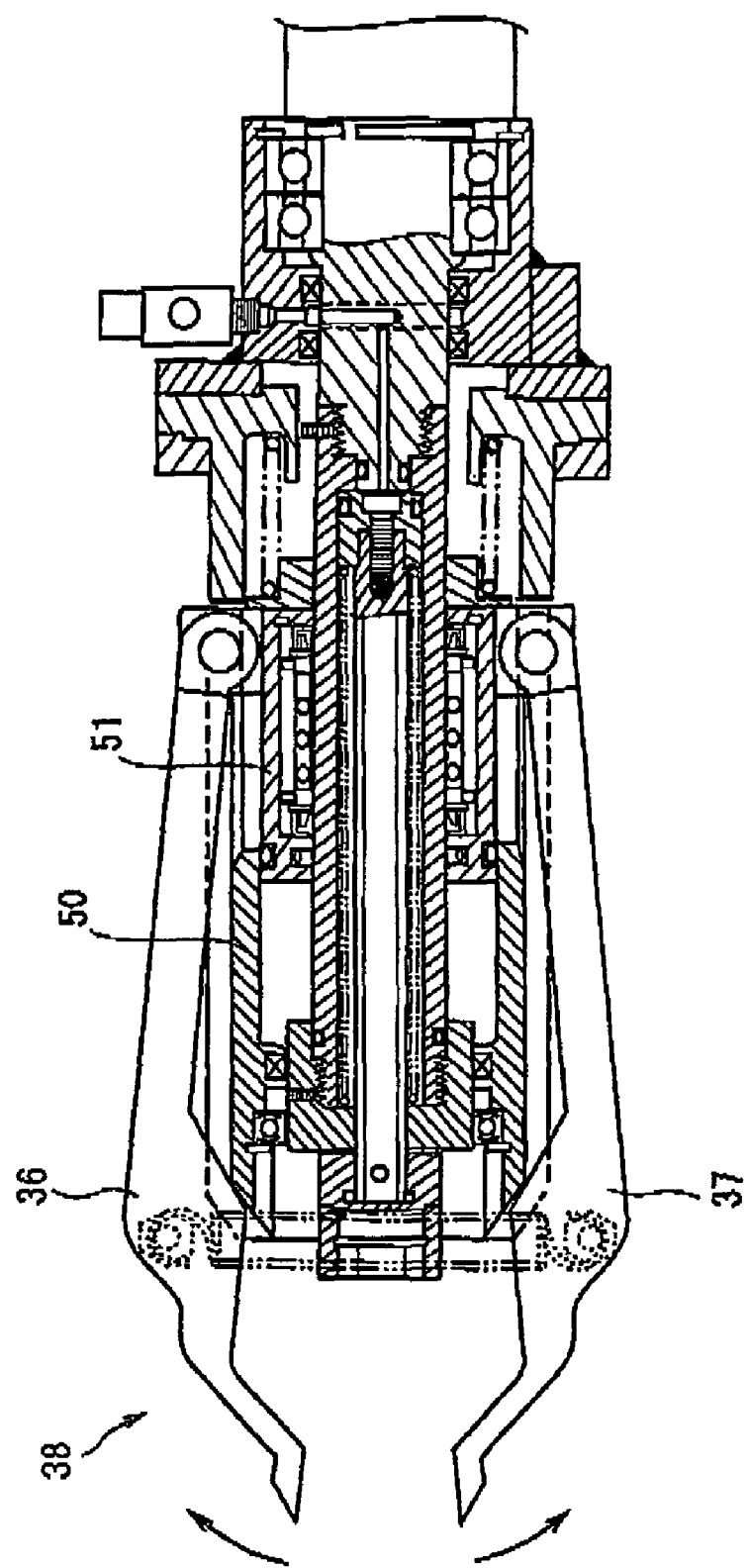
FIG. 11 is an explanatory view of operation of the fastening member fastening apparatus, in which the guide mechanism is in the opened state and the socket on which no hexagon head bolt is fitted is in the retreated position.

First, in step SP11, by operating the automatic machine, the fastening member fastening apparatus in such a state shown in FIG. 1 that the guide mechanism 38 is closed and the hexagon head bolt is not fitted thereon, is transferred to a hexagon head bolt supply station. Then, as shown in FIG. 11, the air from the air supply source is supplied through the second electromagnetic valve 57 to the second cylinder 50, thereby having the second piston 53 moved backwardly to bring the dual claw members 36, 37, namely, the guide mechanism 38 into an opened state.

Figure 12:
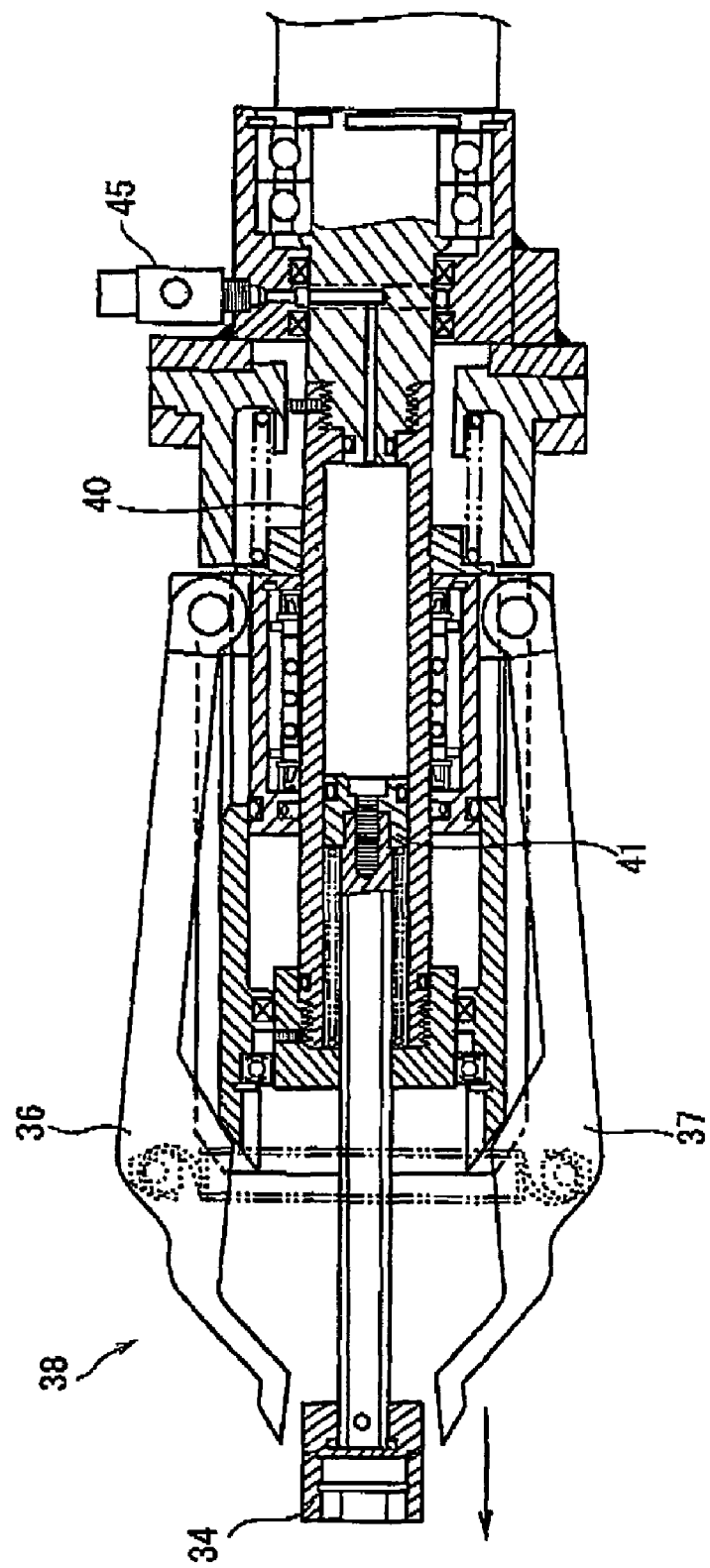
FIG. 12 is an explanatory view of the operation of the fastening member fastening apparatus, in which the guide mechanism is in the opened state and the socket on which no hexagon head bolt is fitted is in the advanced position.

Next, in step SP12, as shown in FIG. 12, when the air from the air supply source is supplied through the first electromagnetic valve 45 to the first cylinder 40 while the guide mechanism 38 is kept opened, the first piston 41 is moved forwardly to bring the socket 34 into an advanced position.

Figure 13:
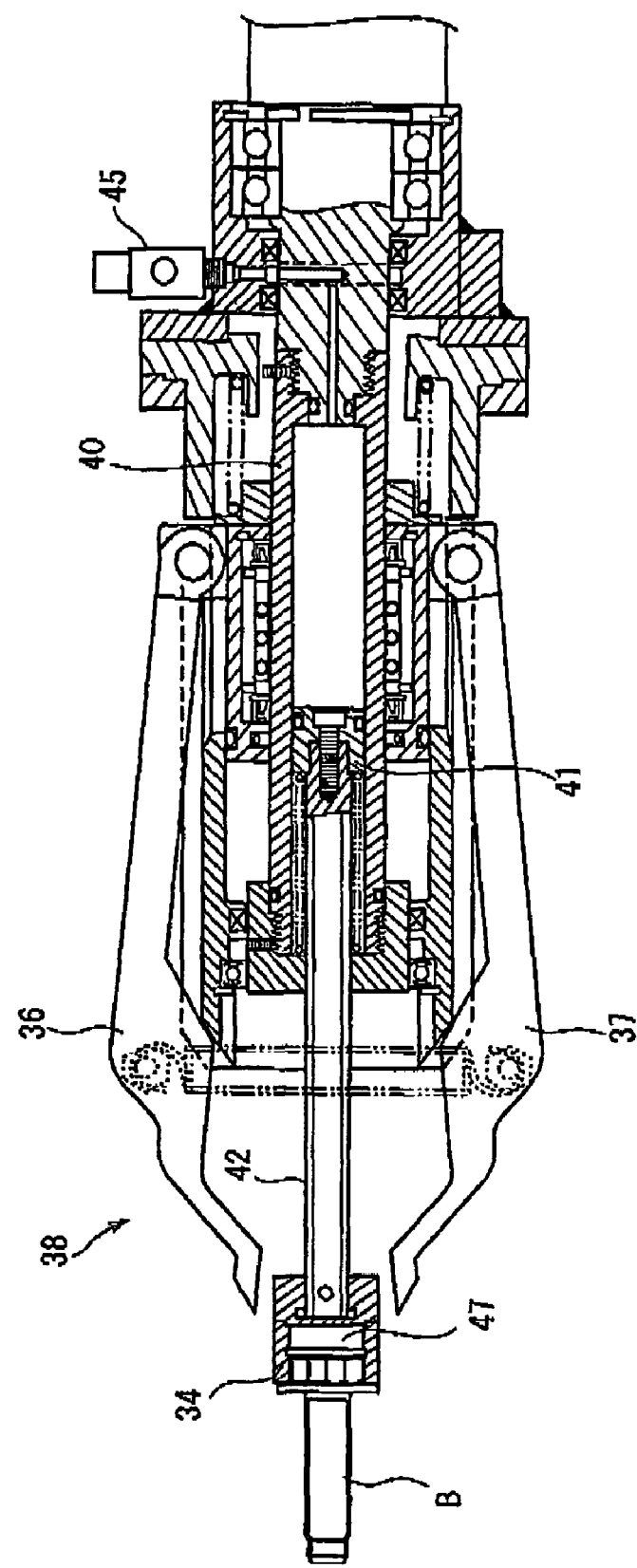
FIG. 13 is an explanatory view of the operation of the fastening member fastening apparatus, in which the guide mechanism is in the opened state and the socket on which the hexagon head bolt is fitted is in the advanced position.

Then, in step SP13, as shown in FIG. 13, the hexagon head bolt is fitted in position on the socket 34 with the aid of the magnet 47 while maintaining the guide mechanism 38 in the opened state and the socket 34 in the advanced position.

Figure 14:
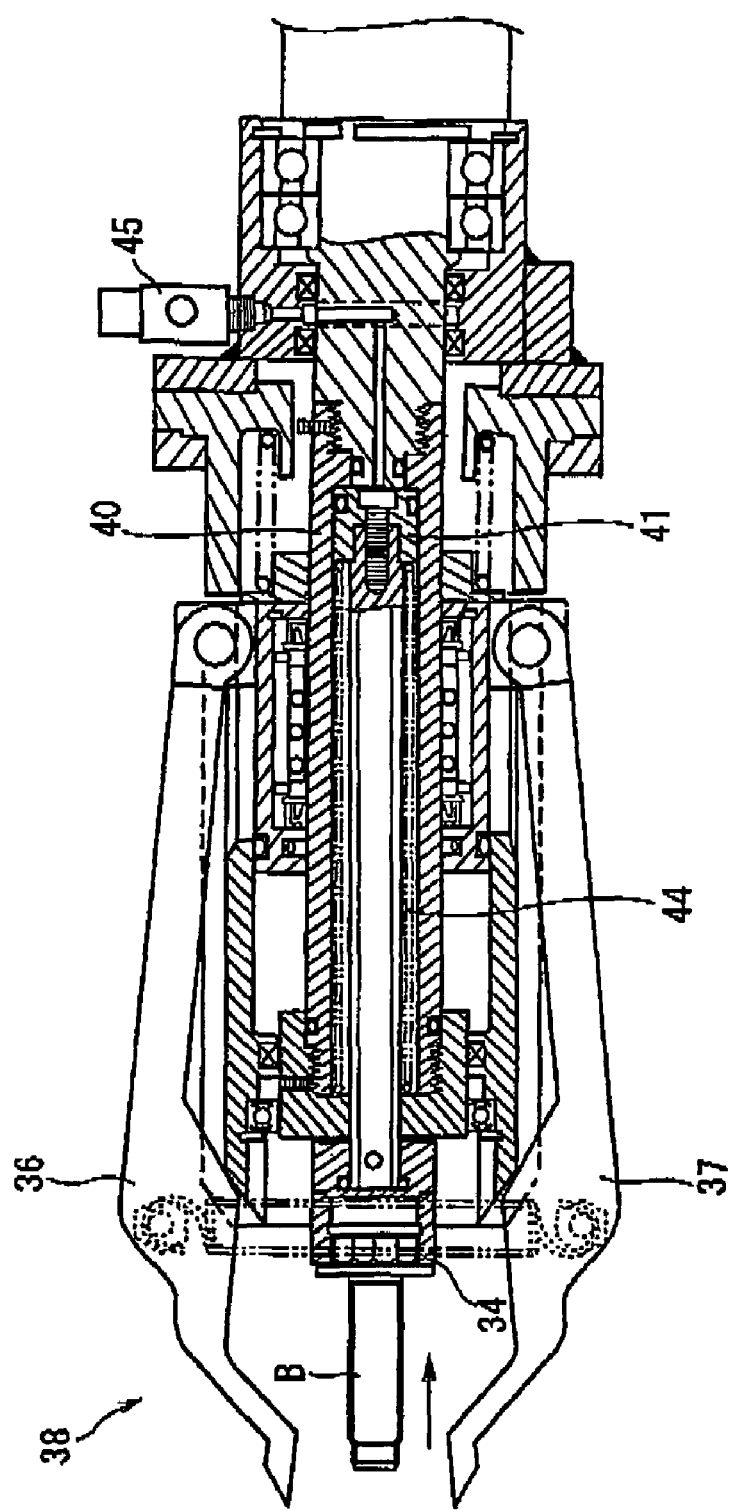
FIG. 14 is an explanatory view of the operation of the fastening member fastening apparatus, in which the guide mechanism is in the opened state and the socket on which the hexagon head bolt is fitted is in the retreated position.

In step SP14, as shown in FIG. 14, the air supplied from the air supply source to the first cylinder 40 is stopped by the first electromagnetic valve 45 while maintaining the guide mechanism 38 in the opened state, and the first piston 41 is moved backwardly by the resilient force of the spring 44 so as to retreat the socket 41 having the hexagon head bolt B fitted thereon.

Figure 15:
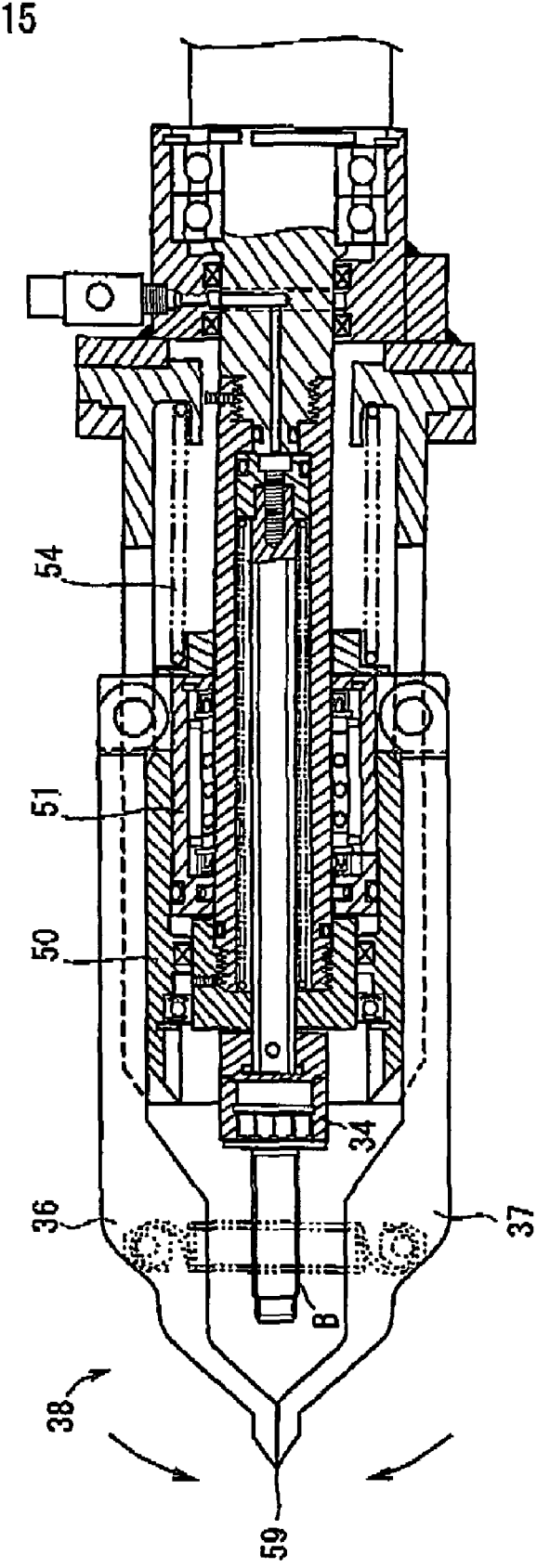
FIG. 15 is an explanatory view of the operation of the fastening member fastening apparatus, in which the guide mechanism is in the closed state and the socket on which the hexagon head bolt is fitted is in the retreated position.

Further, in step SP15, as shown in FIG. 15, the air supplied from the air supply source to the second cylinder 50 is stopped by the second electromagnetic valve 57 and released into the atmosphere, whereby the second piston 51 is moved forwardly by the resilient force of the spring 54 so as to bring the dual claw members 36, 37, namely, the guide mechanism 38 into the closed state.

Next, in step SP16, as shown in FIG. 16, the fastening member fastening apparatus is transferred to a fastening station by operating the automatic machine and the pivotal axis of the rotary axle body 32 is set perpendicularly to the opening Na of the nut N which is fixedly secured to the back surface of the sheet metal member 6, so as to insert the tip end 59 of the guide mechanism 38 into the opening Na. In this manner, the centering of the hexagon head bolt B with respect to the nut N is performed.

Figure 17:
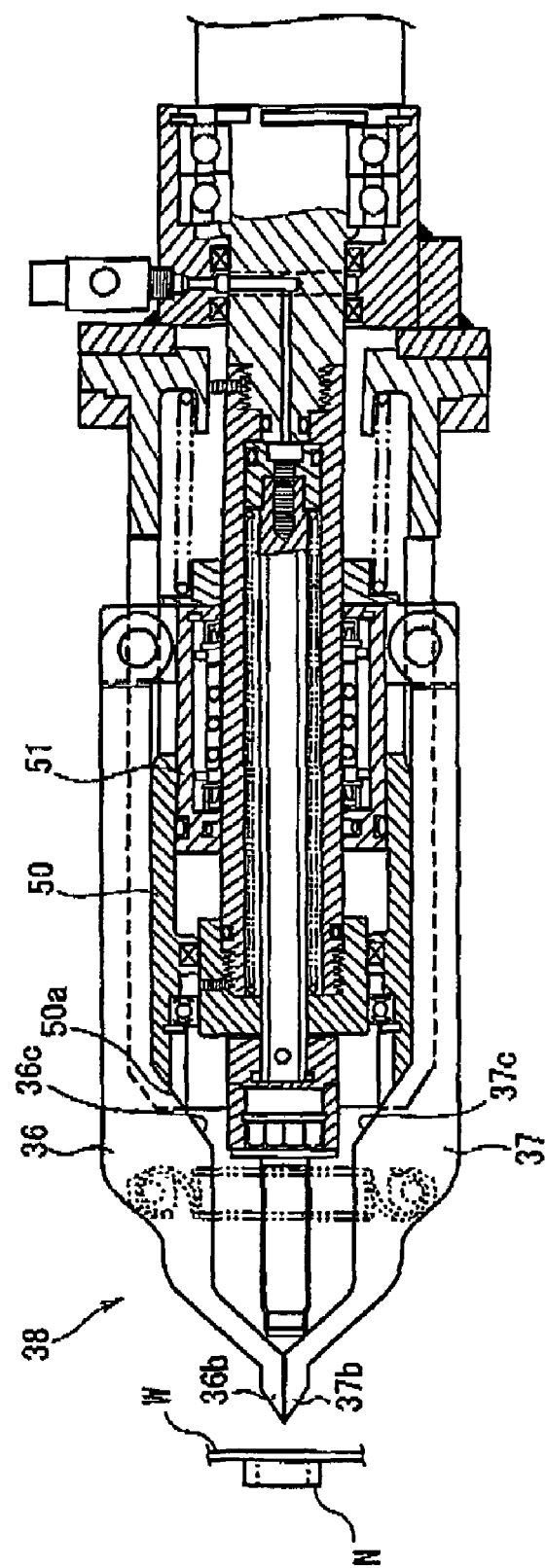
FIG. 17 is an explanatory view of operation of the fastening member fastening apparatus, in which the guide mechanism is closed in a retreated position and the socket on which the hexagon head bolt is fitted is in the retreated position.

Next, in step SP17, as shown in FIG. 17, when the air from the air supply source is supplied through the second electromagnetic valve 57 to the second cylinder 50 thereby having the second piston 51 moved backwardly, the guide mechanism 38 is moved backwardly while maintaining the tip ends 36b, 37b of the pair of the claw members 36, 37 in the combined state until the inclined back walls 36c, 37c of the claw members 36, 37 come into contact with the inclined tip end 50a of the second cylinder 50.

Thus, since the guide mechanism 38 is moved backwardly in the combined state of the tip ends 36b, 37b of the dual claw members 36, 37 at least until the tip ends 36b, 37b of the claw members 36, 37 are retreated from the opening Na of the nut N, it is possible to go to the next step without interference with the nut N.

Figure 18:
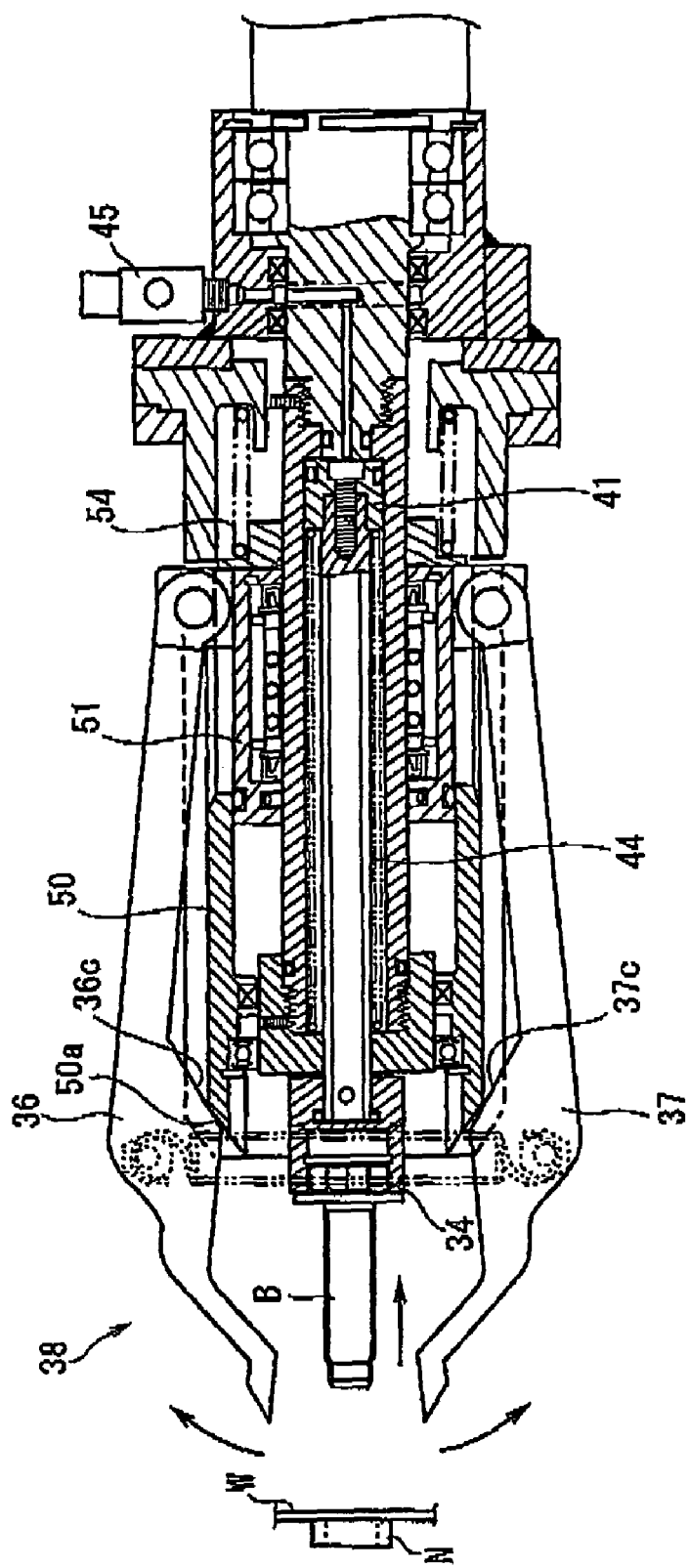
FIG. 18 is an explanatory view of the operation of the fastening member fastening apparatus, in which the guide mechanism is opened and the socket on which the hexagon head bolt is fitted is in the retreated position.

When the second piston 51 is moved more backwardly and the inclined back walls 36c, 37c of the claw members 36, 37 come into contact with the inclined tip end 50a of the second cylinder 50, the dual claw members 36, 37 start to open so as to bring the guide mechanism 38 into the opened state as shown in FIG. 18.

Figure 19:
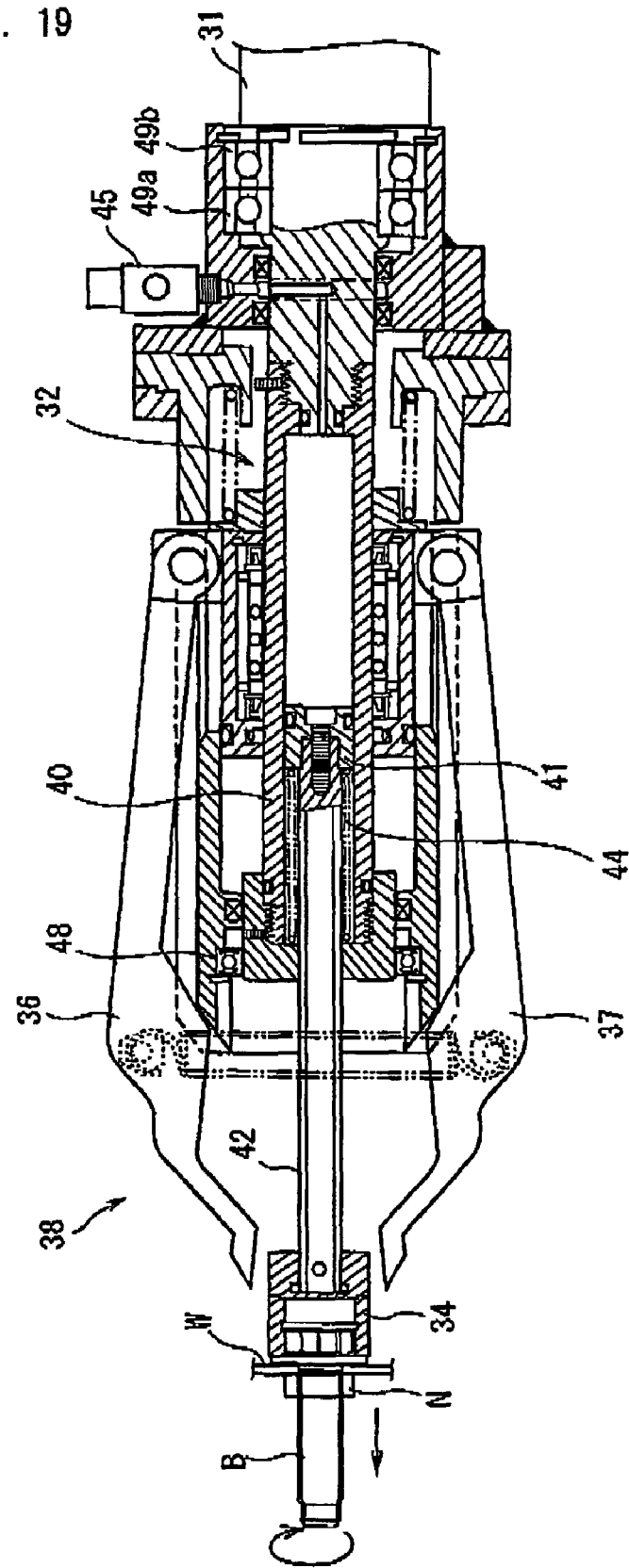
FIG. 19 is an explanatory view of operation of the fastening member fastening apparatus, in which the hexagon head bolt is completely fastened to a nut N.

Next, in step SP18, as shown in FIG. 19, when the air is supplied from the air supply source through the first electromagnetic valve 45 to the first cylinder 40 while maintaining the guide mechanism 38 in the opened state, the first piston 41 is moved forwardly to advance the socket 34, and the rotary axle body 32, namely, the socket 34 is rotated by the rotation drive means 31 so as to fasten the hexagon head bolt B to the nut N.

Figure 20:
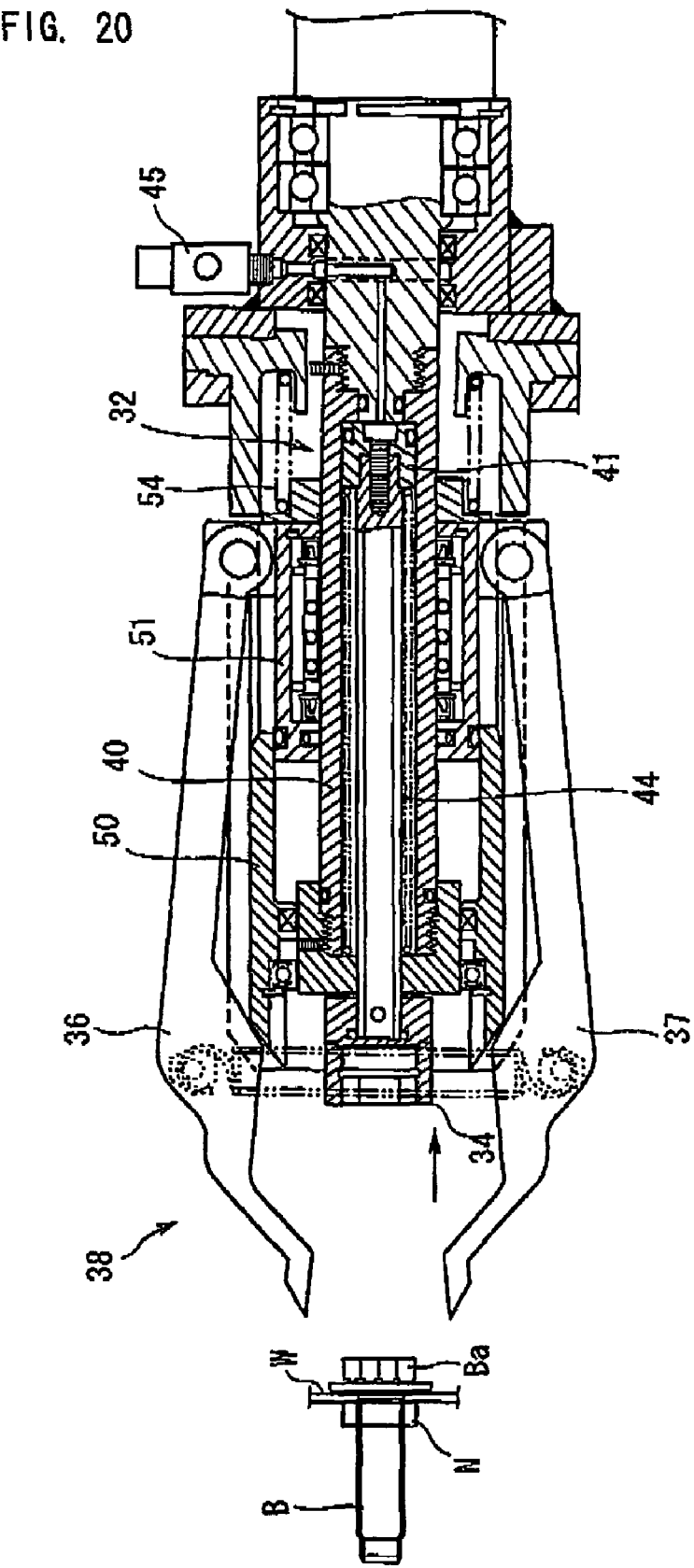
FIG. 20 is an explanatory view of operation of the fastening member fastening apparatus, in which the guide mechanism is opened and the socket on which no hexagon head bolt is fitted is in the retreated position.

Then, in step SP19, when reaching the predetermined fastening torque, the rotation of the rotary axle body 32 is stopped and the air supply from the air supply source to the first cylinder 40 is stopped and released to the atmosphere while maintaining the guide mechanism 38 in the opened state as shown in FIG. 20. Also, the first piston 41 is moved backwardly by the resilient force of the spring 44 to retreat the socket 34 in such a manner that it is disengaged from the head Ba of the hexagon head bolt B.

Further, when the air supply from the air supply source to the second cylinder 50 is stopped by the second electromagnetic valve 57, the second piston 51 is moved forwardly by the resilient force of the spring 54 to bring the dual claw members 36, 37, namely, the guide mechanism 38 into the closed state. Then, the apparatus is returned to its original position by operating the automatic machine.

With the above explained operation steps, the fastening operation of the hexagon head bolt B with respect to the nut N is finished.

APPLICABILITY TO THE INDUSTRY

According to the present invention, the fastening member fitted on the socket is easily positioned with respect to the fastened member merely by inserting the tip end of the guide mechanism formed with the plurality of claw members into the hole of the fastened member, so that the fastening operation of the fastening member may be precisely carried out. Thus, the present invention may be effectively used for the simplified automated fastening means in a motor vehicle production plant, etc.

The invention claimed is:

1. A fastening member fastening apparatus in which a fastening member is positioned with respect to a fastened member so as to fasten the fastening member to the fastened member, comprising:

a rotary axle body being rotatable through a drive source;

a forwardly and backwardly movable socket being connected with a tip end of said rotary axle body to fit the fastening member thereon; and a guide mechanism having a plurality of claw members which are opened and closed in accordance with the forward and backward movement of said socket, wherein said fastening member and said socket are completely encompassed by said guide mechanism when said guide mechanism is closed, and wherein a tip end of said closed guide mechanism is inserted into a hole of the fastened member so as to position and fasten the fastening member fitted on said socket with respect to the fastened member, wherein said rotary axle body is provided with an air cylinder which comprises:

a cylinder formed with a first hollow chamber and a second hollow chamber, a first piston connected with rear ends of said claw members and arranged to be slidable within said first hollow chamber, and a second piston arranged to be slidable within said second hollow chamber which is in communication with said first hollow chamber through a through bore when said first piston is positioned in the rearward of said first hollow chamber, wherein the forward and backward movement of said socket is carried out by the operation of the second piston, and wherein the opening and closing movement of said guide mechanism is carried out by the operation of the first piston.

2. The fastening member fastening apparatus according to claim 1, wherein the backward movement of said socket and the opening movement of said guide mechanism are carried out by operating said first piston and said second piston through a spring.

* * * * *